United States Patent
Heinle et al.

(10) Patent No.: US 11,544,294 B2
(45) Date of Patent: Jan. 3, 2023

(54) DISTRIBUTING TABLES IN A DISTRIBUTED DATABASE USING CONSOLIDATED GROUPING SOURCES

(71) Applicant: SAP SE, Walldorf (DE)

(72) Inventors: Antje Heinle, Muehlhausen (DE); Daniel Biliniewicz, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/117,963

(22) Filed: Dec. 10, 2020

(65) Prior Publication Data

US 2022/0188335 A1 Jun. 16, 2022

(51) Int. Cl.
G06F 16/28 (2019.01)
G06F 16/27 (2019.01)
G06F 16/22 (2019.01)

(52) U.S. Cl.
CPC ........ G06F 16/285 (2019.01); G06F 16/2282 (2019.01); G06F 16/27 (2019.01)

(58) Field of Classification Search
None
See application file for complete search history.

(56) References Cited

U.S. PATENT DOCUMENTS

| | | | |
|---|---|---|---|
| 5,179,701 A | 1/1993 | Chisholm | |
| 5,822,750 A | 10/1998 | Jou | |
| 5,924,094 A | 7/1999 | Sutter | |
| 6,212,524 B1 | 4/2001 | Weissman | |
| 6,226,647 B1 | 5/2001 | Venkatasubramanian | |
| 6,886,035 B2 | 4/2005 | Wolff | |
| 8,572,091 B1 | 10/2013 | Sivasubramanian et al. | |
| 8,768,959 B1 | 7/2014 | Annapragada et al. | |
| 9,432,459 B2 | 8/2016 | Sivasubramanian | |
| 9,870,399 B1 | 1/2018 | Sinclair | |
| 10,423,601 B2 | 9/2019 | Heinle | |
| 10,437,822 B2 | 10/2019 | Heinle | |
| 10,452,632 B1 | 10/2019 | Simmen | |
| 10,691,700 B1* | 6/2020 | Agrawal | G06F 16/2282 |
| 2003/0093408 A1 | 5/2003 | Brown | |
| 2004/0181522 A1 | 9/2004 | Jardin | |
| 2005/0108204 A1 | 5/2005 | Gordon | |
| 2005/0222987 A1 | 10/2005 | Vadon | |
| 2006/0117026 A1 | 6/2006 | Kaler | |

(Continued)

*Primary Examiner* — Robert W Beausoliel, Jr.
*Assistant Examiner* — Cheryl M Shechtman
(74) *Attorney, Agent, or Firm* — Buckley, Maschoff & Talwalkar LLC

(57) ABSTRACT

Methods, systems, and articles of manufacture, including computer program products, are provided for clustering tables. In some implementations the system can include at least one processor and at least one memory. The memory can include program code that provides operations when executed by the processor. The operations can include: retrieving from a first table information source a first set of table pairing association, retrieving from a second table information source a second set of table pairing associations, creating a set of table connections from the first set of table pairing associations and the second set of table pairing associations, creating a table grouping from the set of table connections, and distributing one or more tables to one or more nodes in a distributed database system, wherein the one or more tables are distributed to the one or more nodes in using the table grouping.

19 Claims, 9 Drawing Sheets

(56) References Cited

U.S. PATENT DOCUMENTS

| | | |
|---|---|---|
| 2007/0073759 A1 | 3/2007 | El-Sabbagh |
| 2007/0239763 A1 | 10/2007 | McKeough |
| 2007/0255741 A1* | 11/2007 | Geiger ................ G06F 16/2456 |
| 2007/0271570 A1 | 11/2007 | Brown |
| 2010/0030801 A1 | 2/2010 | Takayama |
| 2010/0082599 A1 | 4/2010 | Graefe |
| 2011/0173219 A1 | 7/2011 | Bent |
| 2011/0196857 A1 | 8/2011 | Chen |
| 2013/0031229 A1 | 1/2013 | Shiga |
| 2013/0080416 A1 | 3/2013 | Meade |
| 2013/0159251 A1 | 6/2013 | Skrenta |
| 2013/0159347 A1 | 6/2013 | Klein |
| 2013/0311421 A1 | 11/2013 | Erdogan |
| 2014/0149355 A1 | 5/2014 | Gupta |
| 2014/0229473 A1 | 8/2014 | Mehrotra |
| 2014/0279775 A1 | 9/2014 | Chu |
| 2014/0279853 A1 | 9/2014 | Grondin |
| 2014/0289562 A1 | 9/2014 | Ozawa |
| 2014/0358895 A1 | 12/2014 | Liu |
| 2015/0149513 A1 | 5/2015 | Beigel |
| 2016/0350392 A1 | 12/2016 | Rice |
| 2017/0017674 A1 | 1/2017 | Scheuer |
| 2017/0116315 A1 | 4/2017 | Xiong |
| 2017/0132296 A1 | 5/2017 | Ding |
| 2017/0206600 A1 | 7/2017 | Bixby |
| 2018/0102943 A1 | 4/2018 | Movsisyan |
| 2018/0165331 A1 | 6/2018 | Zhang |
| 2018/0246934 A1 | 8/2018 | Arye |
| 2018/0253457 A1* | 9/2018 | Heinle ................ G06F 16/2282 |
| 2018/0253475 A1* | 9/2018 | Heinle .................. G06F 16/211 |
| 2018/0260421 A1 | 9/2018 | Kumar |
| 2018/0357289 A1* | 12/2018 | Wittke .................. G06F 16/285 |
| 2018/0357298 A1* | 12/2018 | Andrei .................... G06F 16/27 |
| 2019/0034463 A1 | 1/2019 | Jeong |
| 2019/0102440 A1 | 4/2019 | Tabak |
| 2019/0163773 A1* | 5/2019 | Sun ...................... G06F 16/278 |
| 2019/0163795 A1 | 5/2019 | Lai |
| 2019/0188308 A1* | 6/2019 | Simon .................. G06F 16/211 |
| 2019/0311053 A1 | 10/2019 | Heinle |
| 2019/0311063 A1 | 10/2019 | Heinle |
| 2020/0192914 A1 | 6/2020 | Heinle |
| 2021/0374138 A1* | 12/2021 | Delbru .................. G06F 16/278 |

\* cited by examiner

300

| Query ID | Table |
|---|---|
| 1 | A | ← 301
| 1 | B | ← 302
| 1 | C | ← 303
| 2 | D | ← 304
| 2 | E | ← 305

| Object ID | Object Type | Table |
|---|---|---|
| 1 | View | F | ← 311
| 1 | View | G | ← 312
| 1 | View | H | ← 313
| 2 | Function | A | ← 314
| 2 | Function | D | ← 315

| Group ID | Table |
|---|---|
| 1 | I | ← 321
| 1 | J | ← 322
| 1 | K | ← 323
| 2 | L | ← 324
| 2 | M | ← 325

FIG. 3C

| Table Connection ID | Table Connection Type | Table |
|---|---|---|
| 1 | Statement Cache | A |
| 1 | Statement Cache | B |
| 1 | Statement Cache | C |
| 2 | Statement Cache | D |
| 2 | Statement Cache | E |
| 3 | Dependent Object | F |
| 3 | Dependent Object | G |
| 3 | Dependent Object | H |
| 4 | Dependent Object | A |
| 4 | Dependent Object | D |
| 5 | Existing Group | I |
| 5 | Existing Group | J |
| 5 | Existing Group | K |
| 6 | Existing Group | L |
| 6 | Existing Group | M |

DISTRIBUTING TABLES IN A DISTRIBUTED DATABASE USING CONSOLIDATED GROUPING SOURCES

FIELD

The present disclosure generally relates to database processing and, more specifically, to the clustering of tables in a distributed database system.

BACKGROUND

Data in a distributed database system is stored across a multitude of physically and/or logically distinct nodes. For example, data in a distributed database system may be stored on different computers. Alternately or additionally, data in a distributed database system may be managed by separate processes. As such, executing a query (e.g., a structured query language (SQL) statement or the like) in a distributed database system may require multiple nodes to perform operations on the data stored at and/or managed by each individual node. Moreover, executing the query may further require a transfer of data (e.g., intermediate query results) between multiple nodes.

SUMMARY

Methods, systems, and articles of manufacture, including computer program products, are provided for clustering tables. In some implementations of the current subject matter, there is provided a system. The system can include at least one processor and at least one memory. The at least one memory can include program code that provides operations when executed by the at least one processor. The operations can include: retrieving from a first table information source a first set of table pairing association, retrieving from a second table information source a second set of table pairing associations, creating a set of table connections from the first set of table pairing associations and the second set of table pairing associations, creating a table grouping from the set of table connections, and distributing one or more tables to one or more nodes in a distributed database system, wherein the one or more tables are distributed to the one or more nodes in using the table grouping.

In some variations, the set of table connections are represented in a consistent format. In some variations, the operations can further include storing the set of table connections in a persistent storage. In some variations, the first table information source is a statement cache, a dependent object list, or an existing group list. In some variations, the operation can further include retrieving from a third table information source a third set of table pairing associations, and adding one or more table connections to the set of table connections, wherein the one more table connections are created from the third table information source. In some variations, the operations can further include filtering the set of table connections to create a filtered table grouping. In some variations, the operations can further include distributing one or more tables to one or more nodes in the distributed database system, wherein the one or more tables are distributed to the one or more nodes using the filtered table grouping.

In some variations, one or more of the features disclosed herein including the following features can optionally be included in any feasible combination.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 3A, 3B, and 3C depict tables illustrating query and table pairs, dependent objects and table pairs, and existing group table pairs consistent with implementations of the current subject matter;

FIG. 4 depicts a table illustrating table connections consistent with implementations of the current subject matter;

Figure 1:
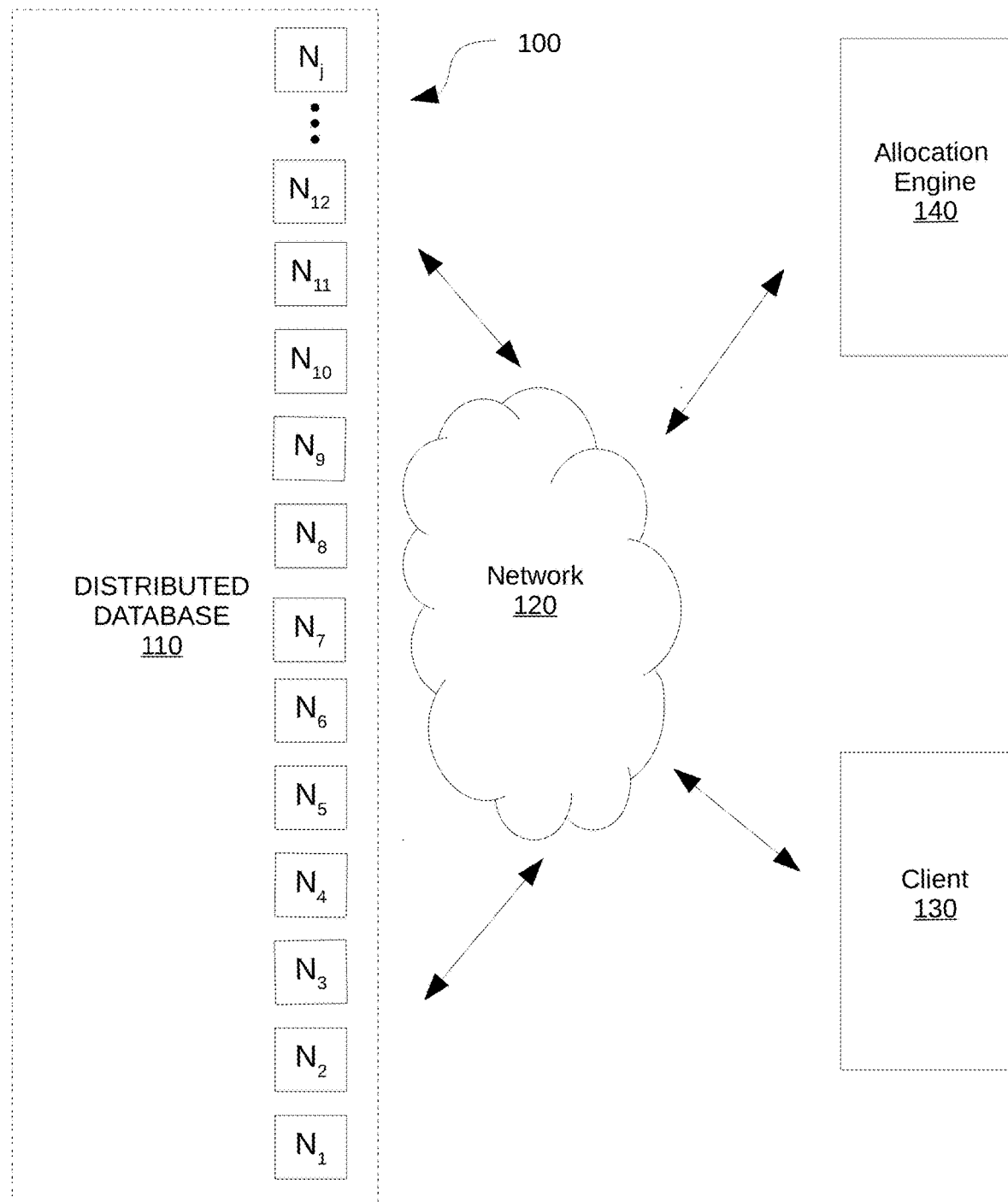
FIG. 1 depicts a network diagram illustrating a network environment consistent with implementations of the current subject matter.

Like labels are used to refer to same or similar items in the drawings.

DETAILED DESCRIPTION

The execution of a query (e.g., a SQL statement or the like) in a distributed database can require a transfer of data (e.g., intermediate query results) between multiple nodes in the distributed database, thereby increasing the network overhead (e.g., bandwidth) associated with the query. Accordingly, the storage and/or management of data are typically distributed across various nodes in a manner that minimizes the transfer of data between nodes. For instance, data that is required to respond to different queries may be stored in two or more tables such that these tables are generally be used (e.g., accessed) together when responding to various queries. These tables would typically be stored at and/or managed by the same node in an effort to maximize the locality of the data stored at the node. But while maximizing the locality of data can reduce the transfer of data between the nodes in a distributed database, it can also introduce a workload (e.g., central processing unit (CPU) load, query load, memory load, and/or the like) imbalance across the nodes in the distributed database. For example, maximizing data locality may concentrate the storage and/or management of tables to very few nodes in the distributed database. As such, a small number of nodes may be required execute a disproportionately high number of queries while other nodes in the distributed database remain largely idle. Consequently, the process of distributing the tables of a database in a distributed database system involves trying to optimize the co-location of tables that are frequently used together by the database while also not overloading any particular node in the distributed database system in order to avoid performance bottlenecks.

Tables that are used together in a query can be grouped together to form a table connection. Table connections, in turn, can be linked together to form table groupings. A table grouping can then be used to distribute tables across the nodes in a distributed database. Embodiments that are consistent with implementation of the current subject matter can be configured to create table connections that can in turn be used to create table groupings that are in turn used to distribute tables across the node of a distributed database. This distribution can be done in a manner that tries to maximize the locality of data that is frequently used together while at the same time not overloading any particular node in the distributed database.

In addition to creating table connections based on queries, there may also be other relationships between tables which can be used to create table groups that help to optimally distribute tables among the nodes of a distributed database system. For example, tables connections could be formed based on database views or based on stored procedures used in a distributed database. These views, stored procedures, or other similar database objects can be considered to be dependent objects, as these objects are dependent upon various base tables in the distributed database. Dependent objects such as these may also benefit from being stored at and/or managed by the same node within a distributed database as the database would need to access the underlying base tables to these objects when working with these dependent objects. As result, creating table connections based on database views, stored procedures, or other similar dependent objects can also be used to create tables groups that help define how tables can be optimally stored across the nodes of a distributed database.

Additionally, system administrators or other users of the database might be aware of certain tables that would benefit from being stored at and/or managed by a common node because of different characteristics of the application using the database. The potential table groupings from this type of information can also be used to create table connections. These table connections can then be used to create table groups that can be used distribute tables among the nodes of a distributed database. System administrator or other user criteria can be referred to as existing group information.

Furthermore, a system that distributes the tables of a database across the nodes of a distributed database can benefit from being able to take into account multiple different potential table connections from different sources such as query information, dependent object information, existing group information, and potentially other types of table connection information all at the same time in order to form table groups that attempt to optimize the distribution of the tables in a distributed database.

Different instances of distributed database systems may also benefit from emphasizing table connections from one source over another source. For example, it may be the case that a distributed database system that has a heavy OLTP (Online Transaction Processing) workload may benefit from having its tables distributed with a heavier emphasis on table connections derived from query information. A different distributed database with a heavy OLAP (Online Analytical Processing) workload may benefit from having its tables distributed with a heavier emphasis on table connections derived from dependent object information. It is also possible that other instances of a distributed database may benefit from having its tables distributed with table connections derived from a various of sources. Various implementations consistent with the current subject matter are capable of tailoring the mix of table connections used to distribute tables across the nodes of a distributed database in a manner that is suited the distributed database's anticipated workload.

FIG. 1 depicts a network diagram illustrating a network environment 100 consistent with implementations of the current subject matter. Referring to FIG. 1, a distributed database 110 can include a j number of nodes (e.g., $n_1$ through $n_j$). The nodes $n_1$ through $n_j$ can be communicatively coupled via a wired and/or wireless network 120. The wired and/or wireless network 120 can be a wide area network (WAN), a local area network (LAN), and/or the Internet. The distributed database system 100 can include any number of nodes without departing from the scope of the present disclosure.

In some implementations of the current subject matter, a client 130 can communicate with the distributed database 110 via the wired and/or wireless network 120. For instance, the client 130 can submit a query (e.g., a SQL statement or the like) to the distributed database 110. Data in the distributed database 110 can be stored and/or managed across different nodes (e.g., one or more of the nodes $n_1$ through $n_j$). For instance, one or more of the nodes $n_1$ through $n_j$ may each store at least one table. Meanwhile, executing the query from the client 130 may require data from multiple tables. As such, fulfilling the query from the client 130 can require the use of tables stored at and/or managed by one or more of the nodes $n_1$ through $n_j$. Thus, according to some implementations of the current subject matter, the storage and/or management of different tables can be allocated across the nodes $n_1$ through $n_j$ in a manner that balances the workload (e.g., CPU load, query load, memory load) across the nodes $n_1$ through $n_j$ and/or minimizes the amount of data transfer (e.g., network overhead) amongst the nodes $n_1$ through $n_j$. Similarly, there may be dependent objects, such as views or stored procedures, stored in the database that may use tables stored at and/or managed by one or more of the nodes $n_1$ through $n_j$, and these dependent objects can also be considered into the table allocation process in such a manner that balances the workload (e.g., CPU load, query load, memory load) across the nodes $n_1$ through $n_j$ and/or minimizes the amount of data transfer (e.g., network overhead) amongst the nodes $n_1$ through $n_j$.

Referring again to FIG. 1, an allocation engine 140 can be communicatively coupled with the distributed database 110. In some implementations of the current subject matter, the allocation engine 140 can be configured to identify one or more table groups that each include one or more tables that are used individually and/or in combination to respond to at least a portion of a query at the distributed database 110. Similarly, in some implementations of the current subject matter, the allocation engine 140 can be configured to identify one or more table groups that each include one or more tables that are used individually and/or in combination to create a database view, execute a stored procedure, or used to create another dependent object in the distributed database 110. Additionally, in some implementations of the current subject matter, the allocation engine 140 can be configured to create table groups from information given to the allocation engine 140 from existing groups.

In some implementations of the current subject matter, the functionalities of the allocation engine 140 can be accessed as a remote (e.g., cloud or the like) service via the network 120. For instance, the allocation engine 140 can be deployed at a separate remote platform and/or at the client device 130 as computer software and/or dedicated circuitry (e.g., application specific integrated circuits (ASICs)). Alternately and/or additionally, the allocation engine 140 can also be deployed at the distributed database 110. For example, the allocation engine 140 can be implemented as computer software and/or dedicated circuitry (e.g., ASICs) at one or more of the nodes $n_1$ through $n_j$.

Figure 2:
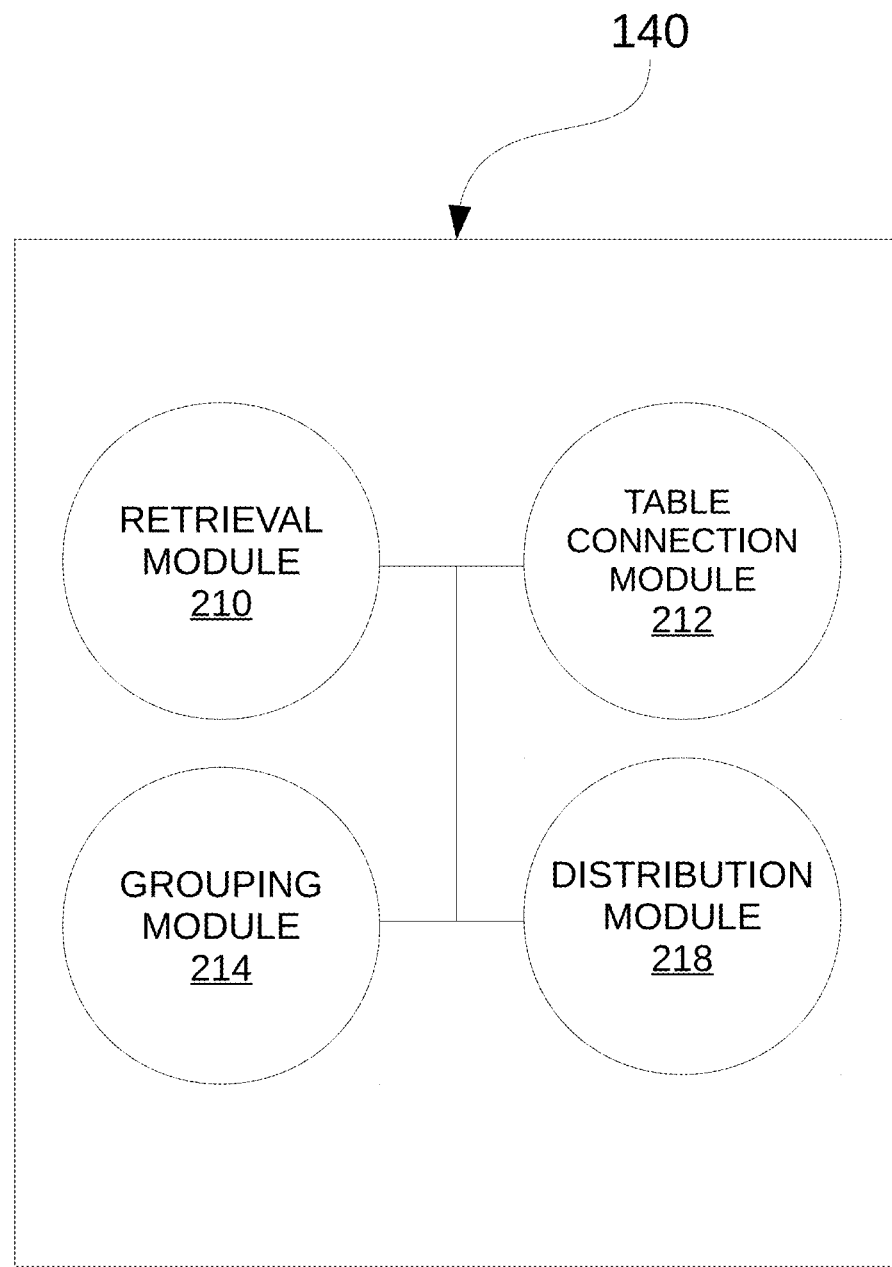
FIG. 2 depicts a block diagram illustrating an allocation engine consistent with implementations of the current subject matter.

FIG. 2 depicts a block diagram illustrating the allocation engine 140 consistent with implementations of the current subject matter. Referring to FIGS. 1-2, some embodiments of the allocation engine 140 can include a retrieval module 210, a table connection module 212, a grouping module 214, and a distribution module 218. It should be appreciated that the allocation engine 140 can include additional and/or different modules without departing from the scope of the present disclosure.

In some implementations of the current subject matter, a retrieval module 210 can be configured to retrieve the information that can be used by the allocation engine 140 to create table connections. The information accessed by the retrieval module 210 can be called a table information source. In one embodiment, the retrieval module 210 can access a statement cache created by a distributed database 110 as table information source. A statement cache can be considered a table information source type. This statement cache may contain lists of queries previously executed by the distributed database 110. The distributed database 110 could use various metrics to select queries for this cache. For example, the database 110 may store the most frequently run queries or queries that were run a certain number of times in a statement cache. The database 110 could alternatively store the most recently executed queries in a statement cache. The database 110 could also store queries that were run on the database during a certain time frame. For instance, the workload of the database 110 may be different during the end of financial quarter period compared to the middle of a financial quarter. A statement cache could capture the workload of either of these timeframes or of any other timeframe that may be relevant. The database 110 could also store operationally expensive queries in a statement cache. It should be appreciated that many other potential statement caches could also be created by the database 110.

The distributed database 110 could also have multiple different statement caches that each use their own different criteria to record various queries. Alternatively, the database 110 could combine different criteria to select queries for a statement cache. For example, a statement cache could record only the queries that were executed at least a certain number of times in a given timeframe.

The retrieval module 210 is capable of accessing one or more of any of these types of statement caches related to the distributed database 110. In some embodiments consistent with the disclosure of this subject matter, a statement cache may be directly accessed by the retrieval module 210. For instance, if a statement cache is in the form of a text file stored somewhere within the database 110 system, the retrieval module 210 can be configured to directly access this file within the database 110 system. Alternatively, embodiments of the retrieval module 210 may access a table(s) within the database 110 that the databases 110 uses to store its statement cache(s). The retrieval module 210 could use a simple SQL statement to access a statement cache stored in this manner. A statement cache could also be accessed by accessing log files, accessing caches within the database 110, or by accessing other similar locations within the database 110.

The retrieval module 210 is also able to access lists of dependent objects. A list of dependent objects can be used as a table information source. A dependent object list can be considered a table information source type. Similar to a statement cache, a list of dependent objects could be directly accessible by the retrieval module 210. Alternatively, a list of dependent objects could be accessed by the retrieval module 210 through other well-known means, such as by querying the database 110 for dependent object information, accessing other log files of the database 110, caches of the database 110, etc. Dependent objects could include information on table views, stored procedures, and other similar dependent objects within the database 110.

The retrieval module 210 is also able to access lists of existing group information. A list of existing group information can be used as a table information source. A list of existing group information can be considered a table information source type. In one embodiment, existing group information is stored in a designated table within the database 110, and the retrieval module 210 accesses this table through appropriate means. The information in this designated table could be entered in by a system administrator or other user of the database 110. The information in this table could also be generated in some automated manner by the database 110 or a process running on top of the database 110. For example, this automated manner could be implemented by a script that used its own criteria to create this group information. In other embodiments, the existing group information could be stored and accessed in a log file, given to the retrieval module through a configuration tool, or accessed by the retrieval module by any other appropriate for accessing that information.

The retrieval module 210 can also be able to access other types of table information sources besides query information, dependent object information, or existing group information. Any type of information that could be used to associate tables together in an advantageous way for distribution in the distributed database 110 could potentially be used as a table information source.

In some implementations of the current subject matter, a table connection module 212 can be configured to identify one or more sets of connected table sets. The table connection module 212 can use the information retrieved by the retrieval module 210 to identify the one or more sets of connected tables. For example, the table connection module 212 could examine the information retrieved by the retrieval module 210 to identify one or more tables that were used together in a query executed by a distributed database 110. The tables identified in this query could then be linked together in a table connection. If there were multiple queries retrieved by the retrieval module 210, the table connection module 212 could form additional table connections in a similar manner to the first query retrieved.

Similarly, a table connection module 212 can create table connections based upon dependent object information. For example, the tables used to create a database view can be used to create a table connection. Additionally, tables accessed by a stored procedure could be used to create a table connection. Existing group information can also be used by a table connection module 212 to create table connections in a manner similar to queries, views, stored procedures, etc. Finally, any other table information source retrieved by the retrieval module 210 can be used by the table connection module 212 to create table connections.

In some embodiments, the table connection module 212 may represent the table connections it creates in a consistent format. This consistent format could represent the table connections in a consistent form regardless of the table information source accessed by the retrieval module 210. In embodiments consistent with a consistent format of table connections, the table connections from a statement cache would be in the same general format as the table connections from a dependent object list. This transformation into a consistent format can be useful in that it can allow the allocation engine 140 to create table groups with a consistent set of input data from a variety of different sources. A consistent format can also make it easier for the allocation engine to apply filters to the table connection in order to better tailor the distribution of tables across the nodes of a distributed database 110 for a specific use case of the database. The table connections can also be stored for future use in this consistent format. In some embodiments, these stored table connections can be used to form different table groupings for different use scenarios for distributed databases.

In some embodiments, the table connection module 212 may filter out certain table connections that it would ordinarily create based on certain use cases. For example, it may be the case that table connections involving a given table in a database 110 tend to produce table groupings that are not ideal for the distributed database 110 for any number of reasons. One reason could be that the inclusion of this given table results in table groups that are too concentrated among too few nodes in the distributed database 110. Alternatively, it may be desirable to not create table connections based upon certain schema in the distributed database 110. For example, in certain use cases it may be desirable to filter out certain system tables based on a schema contained within the distributed database 110. Similarly, it is possible to filter out connections based on other criteria, such as filtering out table connections from certain table information sources.

In some implementations of the current subject matter, a grouping module 214 can be used to group tables that can be located at a given node in the distributed database system 110. In one embodiment, a grouping module 214 can group tables together based on table connections created by a table connection module 212. The grouping module 214 can examine each table connection defined by the table connection module 212, and the grouping module 214 can assign tables to table groups based on these table connections. For example, if a table connection was created that linked tables A, B, and C together because those tables were used together in a query executed by the distributed database 110, then the grouping module 214 may group tables A, B, and C together in a table group. Similarly, if a table connection exists that also links tables A and D together because those two tables were used together in a view in the database 110, then table D may also be added to the same table group containing tables A, B, and C.

Some embodiments of the grouping module 214 may also be able to filter out table connections created by the table connection module 212 and not use those table connections in the formation of table groups. For example, the grouping module 214 may wish to filter out all table connections that were created from a table information source of dependent objects. In this example, if a table connection was created that linked tables A, B, and C together because those tables were used together in a query executed by a distributed database 110, then the grouping module 214 may group tables A, B, and C together in a table group. Subsequently, if a table connection exists that also links tables A and D together because those two tables were used together in a view in the database 110, then this relationship between A and D may be ignored and the grouping module 214 may place table D in a table group that is separate from the table group containing tables A, B, and C. Alternate filters could also be applied that filtered out table connections based upon schema, based upon particular tables, or other similar criteria.

In some implementations of the current subject matter, the distribution module 218 can be configured to distribute tables (e.g., of data) for storage at and/or management by one or more of the nodes $n_1$ through $n_j$. The distribution module 218 can be configured to distribute the tables based at least on the table groups determined by the grouping module 214. For example, the distribution module 218 may allocate, based at least on a table group determined by the group module 214, the storage and/or management of different tables to one or more of the $n_1$ through $n_j$ nodes in the distributed database 110. As such, one table group may be stored at and/or managed by one node while another table group may be stored at and/or managed by a different node. Depending on the number of table groups and the number of nodes in the distributed database 110, different nodes may be assigned to varying number of table groups. Distributing the storage and/or management of tables in this manner may balance the workload (e.g., CPU load, query load, memory load) across the nodes $n_1$ through $n_j$ and/or minimize the amount of data transfer (e.g., network overhead) amongst the nodes $n_1$ through $n_j$.

FIGS. 3A, 3B, 3C, 4, 5A, and 5B together illustrate an example of tables taken from a simple distribute database 110 that may be distributed and allocated among nodes of the distributed database 110 according to some embodiments of the current subject matter. The table information illustrated in these figures provide an illustration of how information about tables can be taken from the database 110, table connections can be formed, and ultimately different table groups can be created. One of skill in the art will appreciate that distributed databases 110 can have many thousands (or more) of tables, views, stored procedures, and queries stored in statement caches.

FIG. 3A depicts a table 300 illustrating query and table pairs consistent with implementations of the current subject matter. The query and table pairs represented in FIG. 3A can be considered a table pairing association. For example, table 300 may be a representation of a statement cache found in a distributed database 110. Referring to FIG. 1-3, the query table pairs shown in the table 300 can correspond to a table information source accessed by a retrieval module 210. It should be appreciated that additional information could be found in table 300 according to various embodiments. For example, there could be information stored about query execution time, query execution count, query memory usage, a query timestamp, or other query metadata included in alternative versions of table 300.

In some implementations of the current subject matter, each query can be associated with an identifier (e.g., a unique integer number). As shown in FIG. 3A, the table 300 contains information about two queries with Query ID 1 and Query ID 2. Query ID 1 involved the access of Tables A 301, B 302, and C 303. Query ID 2 involved access of Tables D 304 and E 305. For example, the query represented by Query ID 1 may be a JOIN operation that combined data from Table A, Table B, and Table C. Meanwhile, the query associated with Query ID 2 was a different query that accessed data from Table D and Table E.

FIG. 3B depicts a table 310 illustrating dependent object and table pairs consistent with implementations of the current subject matter. The dependent object and table pairs represented in FIG. 3B can be considered a table pairing association. For example, table 310 may be a representation of a dependent object list found in a distributed database 110. Referring to FIG. 1-3, the dependent object table pairs shown in the table 310 can correspond to a table information source accessed by a retrieval module 210. It should be appreciated that additional information could be found in table 310 according to various embodiments. For example, there could be information stored about store procedure execution time, view access count, view creation timestamp, or other view or query metadata included in alternative versions of table 310.

In some implementations of the current subject matter, each dependent object can be associated with an identifier (e.g., a unique integer number). As shown in FIG. 3B, the table 310 contains information about 2 dependent objects with Object ID 1 and 2. Object ID 1 involves access of tables F 311, G 312, and H 313. Object ID 2 involved access of table A and D. For example, the object represented by Object ID 1 may be a database view that combines data from Table F 311, Table G 312, and Table H 313. In this embodiment, the column Object Type in Table 310 denotes that Object 1 references a view due to the entry "View" in table 310. Meanwhile, the object represented by Object ID 2 is a stored procedure that accesses Table A 314 and D 315. In this embodiment, the column Object Type in Table 310 denotes that Object 2 references a view with the entry "Function".

FIG. 3C depicts a table 320 illustrating group and table pairs consistent with implementations of the current subject matter. The group and table pairs represented in FIG. 3C can be considered a table pairing association. Referring to FIG. 1-3, table 320 may be a representation of existing group information accessed by a retrieval module 210 as a table information source. It should be appreciated that additional information could be found in table 320 according to various embodiments. For example, existing group information could be organized further into various subgroups, contain timestamps, or other relevant meta information.

In some implementations of the current subject matter, each group can be associated with an identifier (e.g., a unique integer number). As shown in FIG. 3C, the table 320 contains information about 2 groups with Group ID 1 and 2. Group ID 1 links Tables I 321, J 322, and K 323. Group ID 2 links Tables L 324 and M 325.

FIG. 4 depicts a table 400 illustrating table connections consistent with implementations of the current subject matter. Referring to FIGS. 3A, 3B, and 3C, table connections can be created by the table connection module 214 from the table information sources accessed by the retrieval module 210. According to some embodiments, table connections created by the table connection module 212 can be stored in a format consistent with table 400. According to some embodiments, the information stored in table 400 could contain additional information for each table connection. Some embodiments, for example, could including information identifying the specific table information source used to create the table connection. Some embodiments could include additional information to differentiate between different dependent object types. Other embodiments could include additional metadata on the underlying queries, views, store procedures, or other underlying objects from the table information sources. Other embodiments could include table connection creation timestamps or other metadata at the table connection layer.

In some embodiments, the table connection module 212 can use the information contained in statement caches, dependent object lists, and existing group information to create table connections. Turning to FIGS. 3A, 3B, and 3C as examples of statement caches, dependent object lists, and existing group information, respectively, a table connection module 214 may create table connections as represented in FIG. 4. For example, since Table 300 links Tables A 301, B 302, and C 303 together under Query ID 1, the table connection module 214 can create a table connection with Table Connection ID 1 401 in Table 400. The table connection module 214 may also indicate that Table Connection ID 1 was taken from a statement cache by indicating that Table Connection ID 1 has a Table Connection Type of "Statement Cache".

In some embodiments, the table connection module 214, may combine table connections from different sources into the same Table 400. As can be seen in the example in FIG. 4, Table Connection ID 3 is based on a dependent object linking Tables F 311, G 312, and H 313, and the table connection module 212 has labeled Table Connection ID 3 as a "Dependent Object" table connection type. Table Connection ID 6 is based on an existing group that links Tables L 324 and M 325, and the table connection module 212 has labeled Table Connection ID 6 as an "Existing Group" table connection type. Table Connection IDs 1, 3, and 6 are all stored together in Table 400 and Table Connection IDs 1, 3, and 6 were created based on different table information sources accessed by the retrieval module 210.

In some embodiments, the table connection module 212, may represent table connections from different sources in a consistent format. A consistent format can be seen in Table 400. As can be seen in the example in FIG. 4, Table Connection IDs 1, 3, and 6 all have entries for a Table Connection ID, Table Connection Type, and a list of Tables associated with them. Other embodiments that represent table connections with a consistent format may store additional information than what is depicted in table 400.

Figure 5A:
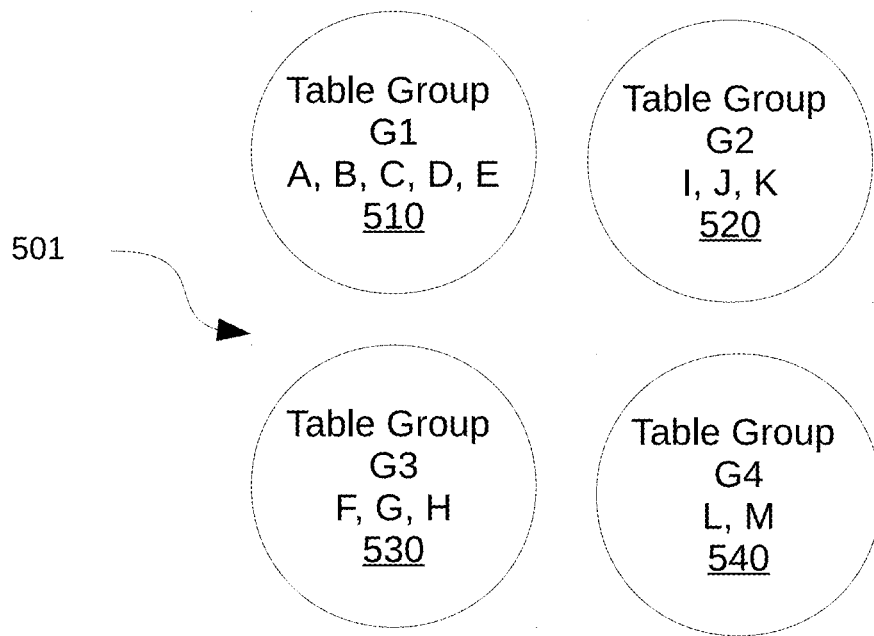
FIGS. 5A and 5B depict a plurality of table groups consistent with implementations of the current subject matter.

FIG. 5A depicts a plurality of table groups 501 consistent with implementations of the current subject matter. According to some embodiments, and using the table connections from FIG. 4. as an illustrative example, the grouping module 214 can take Table Connection ID 1 and assign Tables A, B, and C to Table Group G1 510. The grouping module 214 can then recognize that Table Connection ID 4 links Table A and Table D. The grouping module 214 can then add Table D to Table Group G1 510. The grouping module 214 can then further recognize that Table Connection ID 2 links Table D and Table E. The grouping module 214 can then add Table E to Table Group G1 510. Table Connection IDs 3, 5, and 6 share no common tables among each other or with Table Group 1 510. As a result, the grouping module 214 can assign the tables linked in Table Connection IDs 3, 5, and 6 to Table Groups G2 520, G3 530, and G4 540, respectively.

Figure 5B:
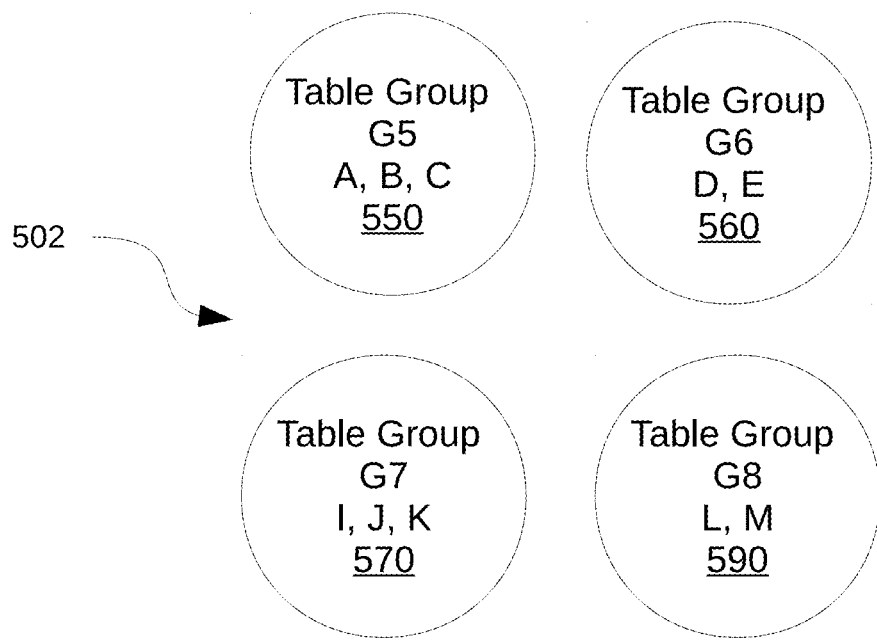

FIG. 5B depicts a plurality of table groups 502 consistent with implementations of the current subject matter. In this example, a filter has been applied to the Table Connections so that the grouping module 214 does not use any Table Connection of Table Connection Type "Dependent Object". According to some embodiments and using the example table connections from FIG. 4. as an illustrative example, the grouping module 214 can take Table Connection ID 1 and assign Tables A, B, and C to Table Group G5 550. Unlike FIG. 5A, the grouping module 214 does not recognize that Table Connection ID 4 links Table A and Table D because this table connection has been filtered out of consideration by the grouping module 214. Therefore, the grouping module 214 may assign Table D and E to their own table group G6 560 as tables D and E are still linked through Table Connection ID 2. As before, Table Connection IDs 5 and 6 share no common tables among each other or with Table Groups 550 or 560. As a result, Table Group G7 570 and G8 590 are formed. In this example, Table Connection ID 3 was also filtered out because it was derived from a dependent object. As a result, the grouping module 214 has processed all of the Table Connections available to it, and Tables F, G, and H are not assigned to a table group. In some embodiment, the grouping module may assign Tables F, G, and H each to their own Table Group. In other embodiments, the grouping module 214 may decide to allocate Tables F, G, or H to existing table groups. And in other embodiments, the grouping module 214 may decide to allocate Tables F, G, or H to some combination of existing table groups and new table groups.

Tables groups formed by the grouping module 214 represented by FIG. 5A or FIG. 5B can then be passed to the distribution module 218 for distribution to a distributed database 110. In some embodiments, the plurality of table groups 501 may be better optimized for a first distributed database system. In some embodiments, the plurality of table groups 502 may be better optimized for a second distributed database system.

Figure 6:
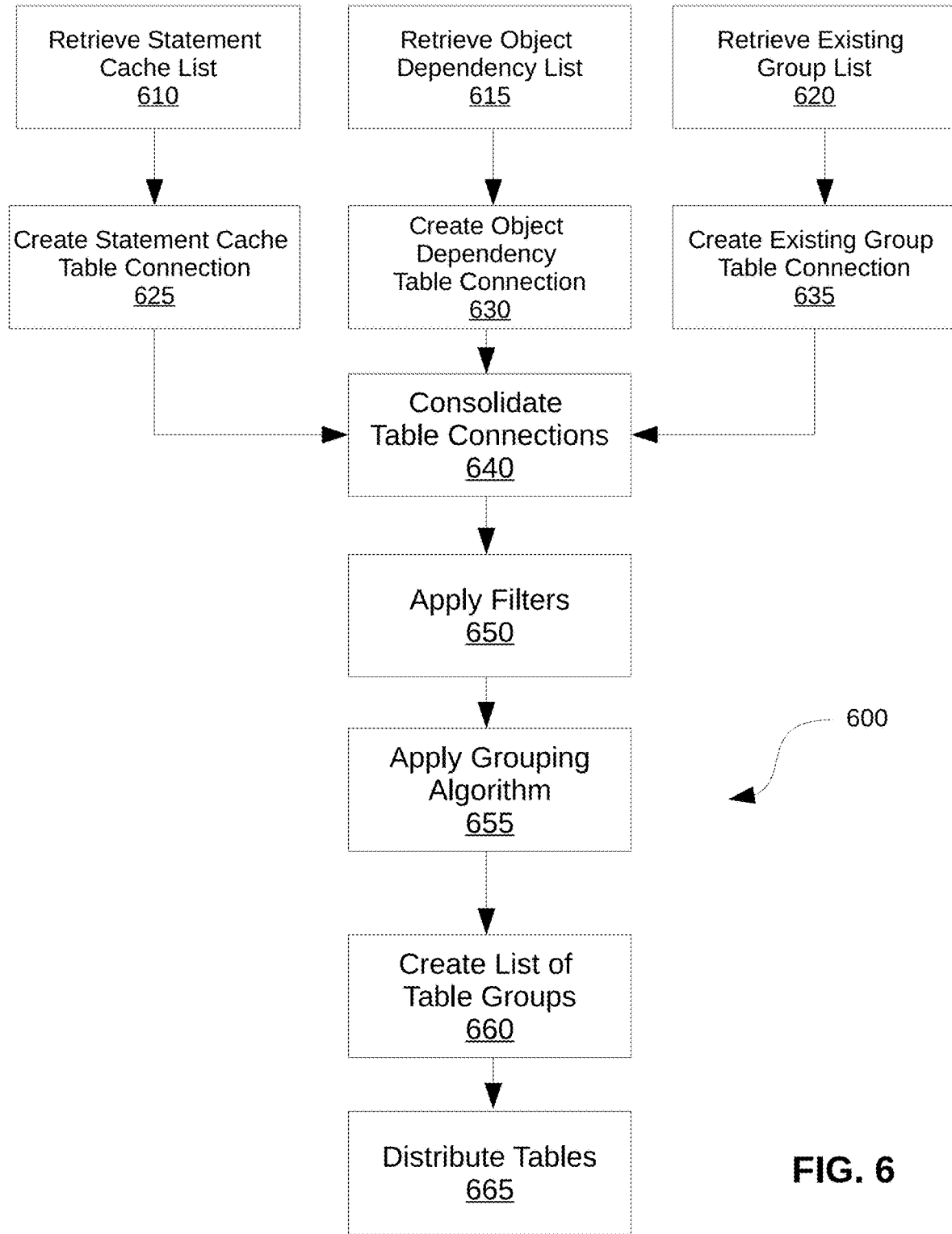
FIG. 6 depicts a flow chart illustrating a process used to distribute tables across the nodes of a database system that is consistent with implementations of the current subject matter.

FIG. 6 depicts a flow chart 600 illustrating a process used to distribute tables across the nodes of a database system that is consistent with implementations of the current subject matter.

At steps 610, 615, and 620, information from table information sources is retrieved. In some embodiments, these steps can be carried out by a retrieval module 210. At step 610, a statement cache list is retrieved. An example statement cache may be consistent with the information shown in table 300 in FIG. 3A. At step 615, an object dependency list is retrieved. An example object dependency list may be consistent with the information shown in table 310 in FIG. 3B. At step 620, an existing group list is retrieved. An example existing group list may be consistent with the information shown in table 320 in FIG. 3C.

Figure 7:
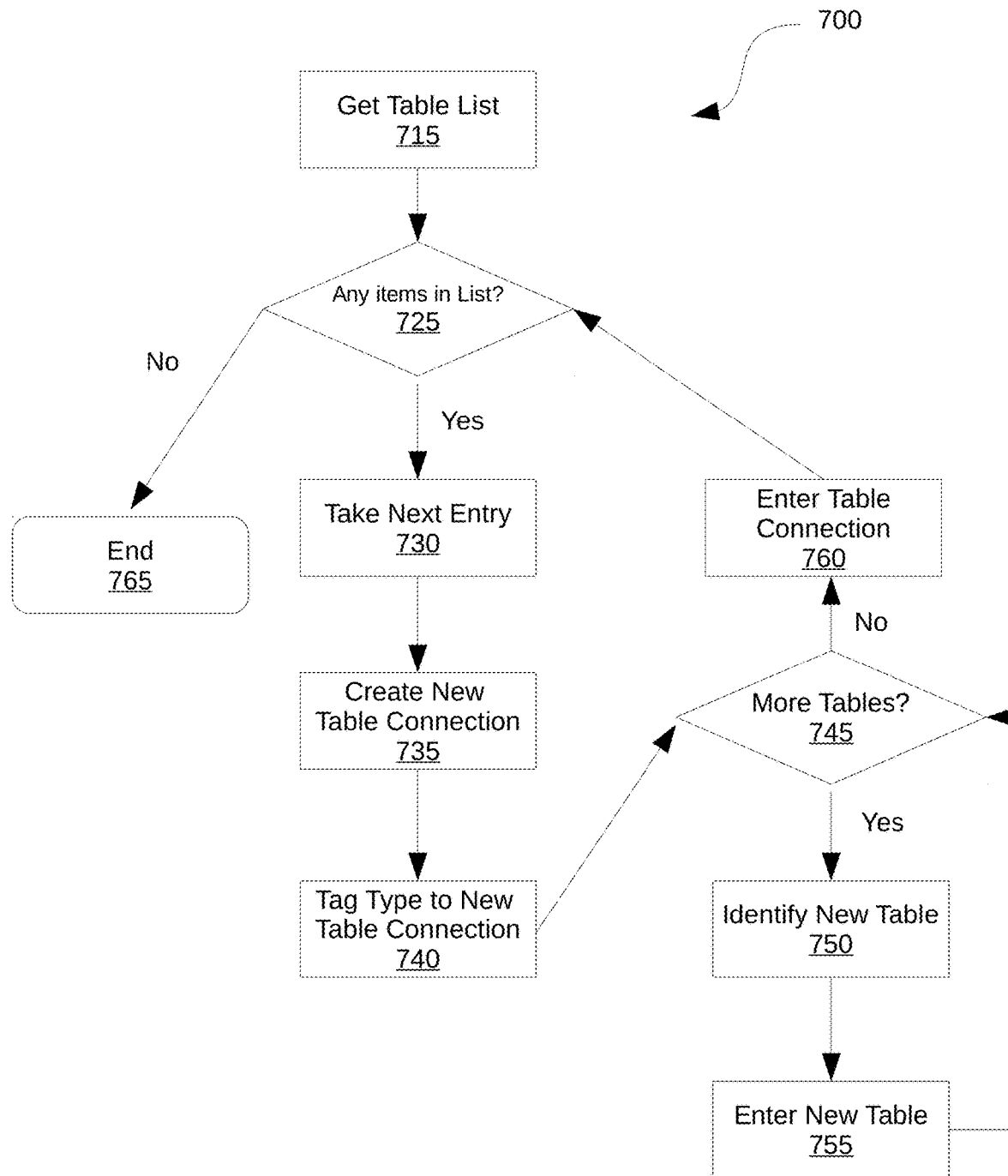
FIG. 7 depicts a flow chart illustrating a process used to create table connections in a manner that is consistent with implementation of the current subject matter.

At steps 625, 630, and 635, table connections are created. In some embodiments, these steps can be carried out by a table connection module 212. An example embodiment of a table connection creation process is illustrated in FIG. 7. The table connection creation process can be applied to the statement cache retrieved at step 610. This is represented at step 625. Similarly, the table connection creation process can be applied to the dependency list retrieved at step 615. This is represented at step 630. Also, the table connection creation process can be applied to the existing group list retrieved at step 620. This is represented at step 635.

At step 640, the table connections created at steps 625, 630, and 635 can be consolidated together. In some embodiments, this consolidation step 640 can be carried out by a table connection module 212. An example of the result of this consolidation can be seen in Table 400 in FIG. 4. In some embodiments, the table connections may be stored in a persistent storage as a part of the consolidation process. Storing the table connections allows for easier creation of different table groupings that may be appropriate for different distributed database instances.

At step 650, filters can be applied to the consolidated table connections. In some embodiments, this step can be carried out by a grouping module 214. For example, one set of filters can be applied to the stored consolidated table connections for a first distributed database instance by the grouping module 214, and a second set of filters can be applied to the same stored consolidated table connections for a second distributed database instance by the grouping module 214. As a result of the filtering, one or more table connections in the consolidated table connections may be removed from consideration for a given set of table groupings created by the grouping module 214. For example, it may be advantageous to filter out all table connections created from object dependencies because those object dependencies may be less relevant for a given distributed database 110 instance. In other situations, it may be advantageous to filter out certain existing group lists as some existing groups defined in the existing groups list may be less relevant for a given distributed database 110 instance. In still other situations, it may be useful to filter out all table connections containing a given table as that given table may be less relevant for a given distributed database 110 instance.

At step 655, a grouping algorithm can be applied to the filtered consolidated table connections. In some embodiments, this step can be carried out by a grouping module 214. An example grouping algorithm is described in more detail in FIG. 8.

At step 660, table groups created by the grouping algorithm are created. In some embodiments, this step can be carried out by a grouping module 214. Examples of potential table groupings can be seen in the diagrams at 501 and 502 in FIG. 5A and FIG. 5B, respectively.

At step 665, the tables are distributed to the nodes of a distributed database system. In some embodiments, this step can be carried out by a distribution module 218. In these embodiments, the distribution module 218 can take the table groups and perform the process of actually moving the tables of the database 110 to their nodes within the distributed database 110.

FIG. 7 depicts a flow chart 700 illustrating a process used to create table connections in a manner that is consistent with implementation of the current subject matter. In some embodiments, the steps for flow chart 700 can be carried out by a table connection module 212. In some embodiments, the steps of flow chart 700 may be executed multiple times using different starting sets of information. For example, the steps of flow chart 700 may be executed on a statement cache (e.g., at step 625 in FIG. 6), on an object dependency list (e.g., at step 630 in FIG. 6), and on an existing group list (e.g., at step 635 in FIG. 6).

At step 715, a table list is used as the starting input for the table connection creation process. In some embodiments, this table list may be supplied by the retrieval module 210 and may list tables that are paired with queries, dependent objects, existing groups, or other similar pairings. In some embodiments, the table list can be acquired through steps such as steps 610, 615, and 620 in FIG. 6.

At step 725, a determination is made as to whether there are any more tables to process in the table list retrieved at step 715. If there are not, then the table connection process can end at step 765. However, if there are tables remaining to be processed, then the process can continue.

At step 730, the next entry in the table list is selected for processing. Table 300 in FIG. 3A can be used as an example of a table list that is consistent with an implementation of the current subject matter. Tables 310 and 320 could alternatively be used as a table list example, and other similar tables can be easily substituted as well. Turning to Table 300, the first entry for processing would be line 301.

At step 735, a table connection can be created based on the selected entry from step 730. In the current example, table connection 401 in FIG. 4 can be created from line 301. A newly created table connection can be assigned a unique Table Connection ID. In this instance, the first Table Connection ID can be "1", and Table A from line 301 can be assigned to this table connection ID at 401.

At step 740, a table connection can be tagged with additional information relevant to the table connection. In this example, line 301 was generated as a result of accessing a statement cache, and so Table Connection ID 1 at line 401 can be tagged with as a Table Connection Type of "Statement Cache". Other embodiments can also tag table connections with other relevant information about the table connection. For example, it may be relevant to include information about the when the table connection was created, when the statement cache was created, the database from which the statement cache originated, etc.

At step 745, the process examines the table list to determine if there are additional tables that should be added to the table connection created at step 735. In this instance, line 301 indicates that this entry is derived from Query ID 1, and Query ID 1 also is associated with Table B and Table C in table 300 at lines 302 and 303, respectively. Since there are additional tables associated with Query ID 1, the process can proceed to step 750.

At step 750, the process identifies a new table that is to be associated with Table Connection ID 1. In this example, Table A can be identified as a table that should be associated with Table Connection ID 1 because it is a part of the same Query ID as entry 301.

At step 755, Table A is added as part of Table Connection ID 1.

Steps 745, 750, and 755 can then be repeated until all Tables associated with the Query ID being processed have in fact been processed.

At step 760, all of the table connections created can be stored. Any entries in the table list processed at steps 735 or 755 can then be removed from consideration for further processing. The process can then return to step 725 to continue processing any remaining unprocessed tables in the table list.

Figure 8:
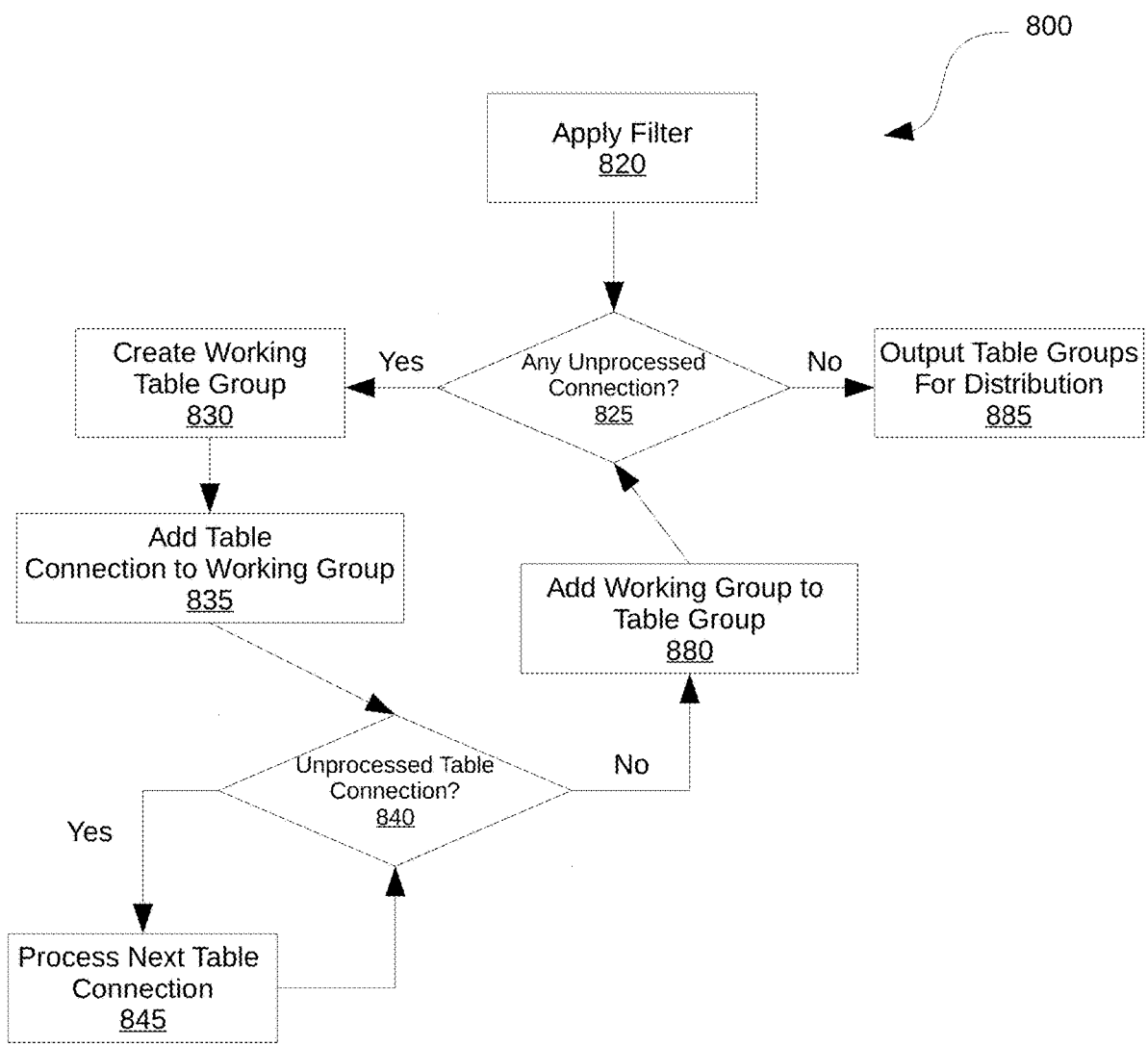
FIG. 8 depicts a flow chart illustrating a process used to create table groups in a manner that is consistent with implementation of the current subject matter.

FIG. 8 depicts a flow chart 800 illustrating a process used to create table groups in a manner that is consistent with implementation of the current subject matter. In some embodiments consistent with the present subject matter, the steps detailed in FIG. 8 can be carried out by a grouping module 214. Some embodiments may also use information such as the table connections in Table 400 in FIG. 4 as an input to process 800. Table 400 will be used as an example input in describing the steps of flow chart 800. The table groupings illustrated in FIG. 5A will also be used as an example output of the process illustrated in flow chart 800.

At step 820, filters can be applied to the table connections 400. For example, one set of filters can be applied to the stored table connections for a first distributed database instance by the grouping module 214, and a second set of filters can be applied to the same stored consolidated table connections for a second distributed database instance by the grouping module 214. As a result of the filtering, one or more table connections in the table connections may be removed from consideration for any table groupings created by the grouping module 214. For example, it may be advantageous to filter out all table connections created from object dependencies because those object dependencies may be less relevant for a given distributed database instance. In other situations, it may be advantageous to filter out certain existing group lists as some existing groups defined in the existing groups list may be less relevant for a given distributed database instance. In still other situations, it may be useful to filter out all table connections containing a given table as that given table may be less relevant for a given distributed database instance. Some embodiments may not apply any filter on the table connections, and thus the process can proceed to step 825 without applying any filter.

At step 825, the process 800 determines whether there are any unprocessed table connections in the list of table connections 400. In this example, since no connections have been processed yet, there are unprocessed table connections in table 400, and the process can proceed to step 830 by examining Table Connection ID 1 at lines 401, 402, and 403. However, if there were no table connections left to process, then the table groups created by process 800 could be output for distribution at step 885. In some embodiments, the distribution module 218 can execute this distribution step to actually carry out the process of moving the tables grouped in process 800 to various nodes in a distributed database 110.

At step 830, a new table group can be created. At this stage, the newly created table group would not yet have any tables assigned to it. For the purposes of this example, this newly created table group will be called the working group.

At step 835, the Table Connection ID 1 can be added to the working group. As a part of this step, Tables A, B, and C would be added to the working group. Additionally, Tables A, B, and C can be marked as processed. By marking the tables as processed, the process 800 can keep track of the tables that have been assigned to a table group. Tables may be members of more than one table connection, and when later table connections are processed, it can be helpful to have an indication as to which tables have already been assigned to a table group.

At step 840, the table connections in 400 are examined to see if there are any additional table groups that should be added to the working group. In this example, the working group contains tables A, B, and C. At step 840, it would be recognized that Table Connection ID 4 also contains Table A, and so the tables listed in Table Connection ID 4 should be added to the working group.

At step 845, any identified table connections to be added to the current working group can be processed and added to the working group. In this example, Table A has already been processed and can be identified as processed by the fact that the table had been marked as processed in step 835. Table D has not yet been processed, and as a result Table D can get added to the working group. Table D can also be marked as processed at this point.

The process 800 then can return to step 840 now that new tables have been added to the table group. After the addition of Table D in step 845, Table Connection ID 2 can be identified as a table connection that should be added to the working group because Table Connection ID 2 contains Table D. At step 845, Table D can be passed upon because it has already been processed, and Table E can be added to the working group. Once again, after table E is added, the process can return to step 840 to determine whether even more table connections can be added to the current working group. Steps 840 and 845 can keep repeating in this manner until there are no additional table connections that are associated with the tables in the working group. In this example, there are no more table connections in Table 400 that contain tables A, B, C, D, and E, and so the process can move to step 880.

At step 880, the working group can be created as a table group. In this example, the working group can be represented by Table Group G1 510 in FIG. 5. The process can then return back to step 825 to either process any remaining Table Connections or to output the created table groups for distribution.

Figure 9:
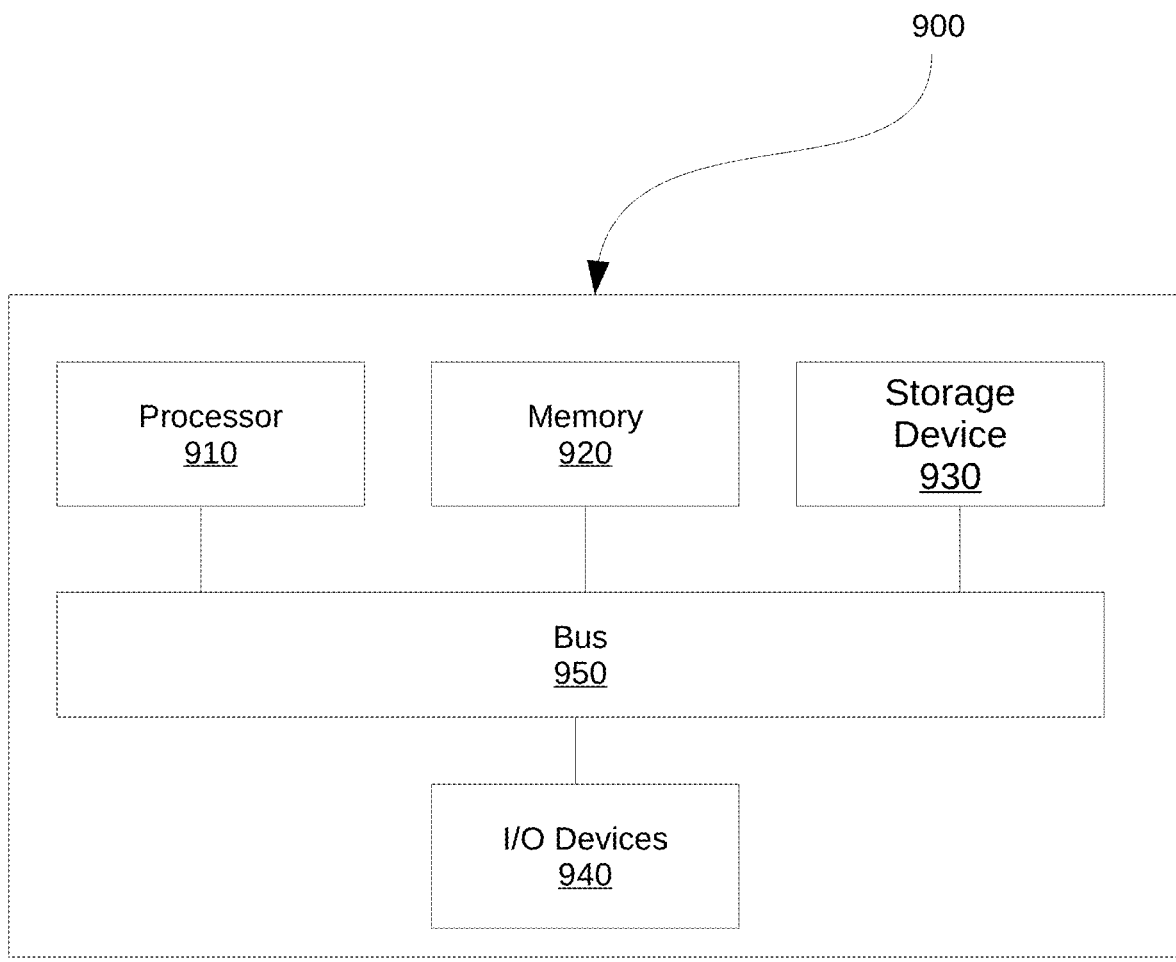
FIG. 9 depicts a block diagram illustrating a computing system consistent with implementations of the current subject matter.

FIG. 9 depicts a block diagram illustrating a computing system 900 consistent with implementations of the current subject matter. Referring to FIGS. 1 and 2, the computing system 900 can be used to implement the allocation engine 140 and/or any components within the allocation engine 140.

As shown in FIG. 9, the computing system 900 can include a processor 910, a memory 920, a storage device 930, and input/output devices 940. The processor 910, the memory 920, the storage device 930, and the input/output devices 940 can be interconnected via a system bus 950. The processor 910 is capable of processing instructions for execution within the computing system 900. Such executed instructions can implement one or more components of, for example, the allocation engine 140 or any of the modules contained within the allocation engine 140.

In some implementations of the current subject matter, the processor 910 can be a single-threaded processor. Alternately, the processor 910 can be a multi-threaded processor. The processor 910 is capable of processing instructions stored in the memory 920 and/or on the storage device 930 to display graphical information for a user interface provided via the input/output device 940.

The memory 920 is a computer readable medium such as volatile or non-volatile that stores information within the computing system 900. The memory 920 can store data structures representing configuration object databases, for example. The storage device 930 is capable of providing persistent storage for the computing system 900. The storage device 930 can be a floppy disk device, a hard disk device, an optical disk device, or a tape device, or other suitable persistent storage means. The input/output device 940 provides input/output operations for the computing system 900. In some implementations of the current subject matter, the input/output device 940 includes a keyboard and/or pointing device. In various implementations, the input/output device 940 includes a display unit for displaying graphical user interfaces.

The term engine can be understood to refer to a set of instructions that can be executed by the processor 910 that can comprise significant functions of the processes described herein. The instructions of an engine can be stored in memory 920 or in storage devices 930. Similarly, the term module can be understood to refer to a set of instructions that can be executed by the processor 910 that can comprise functions of the processes described herein. The instructions of a module can be stored in memory 920 or in storage devices 930. A module may contain a set of instructions that make up a piece of the functionality contained in an engine. It is common to see one or more modules functionally coupled together to perform the larger functions in an engine.

According to some implementations of the current subject matter, the input/output device 940 can provide input/output operations for a network device. For example, the input/output device 940 can include Ethernet ports or other networking ports to communicate with one or more wired and/or wireless networks (e.g., a local area network (LAN), a wide area network (WAN), the Internet).

In some implementations of the current subject matter, the computing system 900 can be used to execute various computer software applications that can be used for organization, analysis and/or storage of data in various (e.g., tabular) format (e.g., Microsoft Excel®, and/or any other type of software). Alternatively, the computing system 900 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 940. The user interface can be generated and presented to a user by the computing system 900 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
    retrieving from a first table information source a first set of table pairing associations, wherein the first table information source is one of: one of a plurality of statement caches, each containing previously executed queries, one of a plurality of dependent object lists, or one of a plurality of existing group lists;
    retrieving from a second table information source a second set of table pairing associations, wherein the second table information source is one of: one of the plurality of statement caches each containing previously executed queries, one of the plurality of dependent object lists, or one of the plurality of existing group lists, wherein the second table information source is a different source from the first table information source;
    creating a set of table connections from the first set of table pairing associations and the second set of table pairing associations, wherein the set of table connections is created based on information contained in at least one of statement caches, dependent object lists and existing group information;
    creating a table grouping from the set of table connections, wherein each table grouping includes two or more tables from at least two table connections of the set of table connections that include a common table; and
    distributing one or more tables to one or more nodes in a distributed database system, wherein the one or more tables are distributed to the one or more nodes in using the table grouping.

2. The computer-implemented method of claim 1, wherein table connections contained in the set of table connections are represented in a consistent format.

3. The computer-implemented method of claim 2, further comprising:
    storing the set of table connections in a persistent storage.

4. The computer-implemented method of claim 1, further comprising:
    retrieving from a third table information source a third set of table pairing associations; and
    adding one or more table connections to the set of table connections, wherein the one more table connections are created from the third table information source.

5. The computer-implemented method of claim 1, further comprising:
    filtering the set of table connections to create a filtered table grouping.

6. The computer-implemented method of claim 5, further comprising:
    distributing one or more tables to one or more nodes in the distributed database system, wherein the one or more tables are distributed to the one or more nodes using the filtered table grouping.

7. The computer-implemented method of claim 1, wherein dependent objects include information on table views, stored procedures and other similar dependent objects within the distributed database system; and wherein existing group information is stored in a designated table within the distributed database system.

8. The computer-implemented method of claim 1, wherein the one or more tables are distributed based on an anticipated workload of the distributed database system.

9. A system, comprising:
    at least one data processor; and
    at least one memory storing instructions which, when executed by the at least one data processor, result in operations comprising:
        retrieving from a first table information source a first set of table pairing associations, wherein the first table information source is one of: one of a plurality of statement caches, each containing previously executed queries, one of a plurality of dependent object lists, or one of a plurality of existing group lists;
        retrieving from a second table information source a second set of table pairing associations, wherein the second table information source is one of: one of the plurality of statement caches each containing previously executed queries, one of the plurality of dependent object lists, or one of the plurality of existing group lists, wherein the second table information source is a different source from the first table information source;
        creating a set of table connections from the first set of table pairing associations and the second set of table pairing associations, wherein the set of table connections is created based on information contained in at least one of statement caches, dependent object lists and existing group information;
        creating a table grouping from the set of table connections, wherein each table grouping includes two or more tables from at least two table connections of the set of table connections that include a common table; and distributing one or more tables to one or more nodes in a distributed database system, wherein the one or more tables are distributed to the one or more nodes in using the table grouping.

10. The system of claim 9, wherein table connections contained in the set of table connections are represented in a consistent format.

11. The system of claim 10, further comprising:
storing the set of table connections in a persistent storage.

12. The system of claim 9, further comprising:
retrieving from a third table information source a third set of table pairing associations; and
adding one or more table connections to the set of table connections, wherein the one more table connections are created from the third table information source.

13. The system of claim 9, further comprising:
filtering the set of table connections before the table group is created.

14. The system of claim 13, further comprising:
distributing one or more tables to one or more nodes in the distributed database system, wherein the one or more tables are distributed to the one or more nodes using the filtered table grouping.

15. A non-transitory computer-readable storage medium including program code, which when executed by at least one data processor, cause operations comprising:
retrieving from a first table information source a first set of table pairing associations, wherein the first table information source is one of: one of a plurality of statement caches, each containing previously executed queries, one of a plurality of dependent object lists, or one of a plurality of existing group lists;
retrieving from a second table information source a second set of table pairing associations, wherein the second table information source is one of: one of the plurality of statement caches containing previously executed queries, one of the dependent object lists, or one of the plurality of existing group lists, wherein the second table information source is a different source from the first table information source; creating a set of table connections from the first set of table pairing associations and the second set of table pairing associations, wherein the set of table connections is created based on information contained in at least one of statement caches, dependent object lists and existing group information;
creating a table grouping from the set of table connections, wherein each table grouping includes two or more tables from at least two table connections of the set of table connections that include a common table; and
distributing one or more tables to one or more nodes in a distributed database system, wherein the one or more tables are distributed to the one or more nodes in using the table grouping.

16. The non-transitory computer-readable medium of claim 15, wherein table connections contained in the set of table connections are represented in a consistent format.

17. The non-transitory computer-readable medium of claim 16, further comprising:
storing the set of table connections in a persistent storage.

18. The non-transitory computer-readable medium of claim 15:
retrieving from a third table information source a third set of table pairing associations; and
adding one or more table connections to the set of table connections, wherein the one more table connections are created from the third table information source.

19. The non-transitory computer-readable medium of claim 15, further comprising:
filtering the set of table connections before the table group is created.

* * * * *